(12) United States Patent
Hrabak et al.

(10) Patent No.: US 10,567,512 B2
(45) Date of Patent: Feb. 18, 2020

(54) SYSTEMS AND METHODS TO AGGREGATE VEHICLE DATA FROM INFOTAINMENT APPLICATION ACCESSORIES

(71) Applicant: GM Global Technology Operations LLC, Detroit, MI (US)

(72) Inventors: Robert A. Hrabak, Birmingham, MI (US); Fan Bai, Ann Arbor, MI (US); Dan Shan, Troy, MI (US); Donald K. Grimm, Utica, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 132 days.

(21) Appl. No.: 15/782,882

(22) Filed: Oct. 13, 2017

(65) Prior Publication Data

US 2019/0116255 A1    Apr. 18, 2019

(51) Int. Cl.
| | |
|---|---|
| H04M 1/725 | (2006.01) |
| H04W 4/00 | (2018.01) |
| H04L 29/08 | (2006.01) |
| H04W 4/40 | (2018.01) |
| G06F 11/07 | (2006.01) |
| H04W 4/38 | (2018.01) |
| H04W 4/80 | (2018.01) |

(52) U.S. Cl.
CPC ............. *H04L 67/12* (2013.01); *G06F 11/07* (2013.01); *H04L 67/1097* (2013.01); *H04W 4/38* (2018.02); *H04W 4/40* (2018.02); *H04W 4/80* (2018.02)

(58) Field of Classification Search
CPC combination set(s) only.
See application file for complete search history.

(56) References Cited

U.S. PATENT DOCUMENTS

| | | | | |
|---|---|---|---|---|
| 6,137,802 | A * | 10/2000 | Jones | H04Q 11/0478 370/401 |
| 7,197,569 | B2 * | 3/2007 | Dowling | G06Q 20/04 370/401 |
| 9,265,073 | B2 * | 2/2016 | Powell | H04W 76/10 |

(Continued)

*Primary Examiner* — Yuwen Pan
*Assistant Examiner* — Erica L Fleming-Hall
(74) *Attorney, Agent, or Firm* — Quinn IP Law

(57) ABSTRACT

A portable system, for use in projecting proprietary host-data-based output to a host device using a dual-layer proprietary-data-provision arrangement including the host device and portable system. A storage component includes one or more first-layer components, of the dual-layer proprietary-data-provision arrangement, that, when executed by a hardware-based processing unit, communicates with the host device by a first wired communication channel or a first short-range wireless communication channel to receive the proprietary host data from the host device. The storage also includes a portable-system application that, when executed, generates, based on the proprietary host data, proprietary host-data-based app output. And the storage includes one or more second-layer components, of the arrangement, that, when executed, communicate with the host device by a second wired communication channel or a second short-range wireless communication channel to provide the proprietary host-data-based app output to the host device for rendering at the host device.

18 Claims, 4 Drawing Sheets

(56) References Cited

U.S. PATENT DOCUMENTS

| | | | | |
|---|---|---|---|---|
| 2006/0111097 A1* | 5/2006 | Fujii | .................. | H04L 63/08 455/420 |
| 2008/0176595 A1* | 7/2008 | Karaoguz | ............. | H04W 28/18 455/552.1 |
| 2008/0227484 A1* | 9/2008 | Auvray | ................ | H04L 67/303 455/552.1 |
| 2009/0064202 A1* | 3/2009 | Lee | .................... | G06F 9/541 719/328 |
| 2010/0202358 A1* | 8/2010 | Wu | .................. | H04L 12/5692 370/328 |
| 2010/0210319 A1* | 8/2010 | Tanaka | .................. | B60R 25/24 455/572 |
| 2011/0153367 A1* | 6/2011 | Amigo | ................. | G06Q 40/08 705/4 |
| 2011/0224842 A1* | 9/2011 | Quinn | .................. | B60K 35/00 701/2 |
| 2015/0120331 A1* | 4/2015 | Russo | ................... | G06Q 40/08 705/4 |
| 2015/0192426 A1* | 7/2015 | Foster | ................ | G01C 21/3629 715/765 |
| 2015/0239408 A1* | 8/2015 | Barrett | .................... | G07C 5/00 701/1 |
| 2016/0088422 A1* | 3/2016 | Foster | ................. | G01S 5/0263 455/41.2 |
| 2016/0212253 A1* | 7/2016 | Akama | ............. | G01C 21/3664 |
| 2016/0248856 A1* | 8/2016 | Kao | ..................... | H04L 67/12 |
| 2016/0304051 A1* | 10/2016 | Archer | .................. | A62C 27/00 |
| 2017/0134554 A1* | 5/2017 | Lee | ........................ | H04L 12/46 |
| 2017/0257227 A1* | 9/2017 | Endo | .................. | H04L 12/4015 |
| 2018/0103022 A1* | 4/2018 | Tokunaga | ............... | B60R 25/24 |
| 2018/0227329 A1* | 8/2018 | Lv | ......................... | H04L 63/20 |
| 2018/0268626 A1* | 9/2018 | Arashima | ............. | G06Q 40/08 |
| 2019/0029074 A1* | 1/2019 | Inoue | .................... | H04L 12/66 |
| 2019/0158629 A1* | 5/2019 | Hrabak | .............. | G01C 21/3697 |

\* cited by examiner

SYSTEMS AND METHODS TO AGGREGATE VEHICLE DATA FROM INFOTAINMENT APPLICATION ACCESSORIES

TECHNICAL FIELD

In one aspect, the present technology relates to systems for use with vehicle infotainment applications and, more specifically, to systems for aggregating vehicle data from infotainment application accessories.

BACKGROUND

This section provides background information related to the present disclosure which is not necessarily prior art.

Most modern vehicles are equipped by original equipment manufacturers (OEMs) with an infotainment unit that can present audio and visual media. The units can present audio received over the Internet by way of an audio application running at the unit, and present video received from a digital video disc (DVD), for instance.

Vehicle telematics, including remote tracking, diagnostics, and maintenance, is also a growing and importance aspect of modern vehicle use. Vehicle data can be shared with customers via regular mailings or emails. Vehicle data is also increasingly being used in various ways for customer or big-data uses as part of the so-called, Internet-of-Things (IoT).

Sharing information between vehicles and local user smartphones via legacy communication channels has shortcomings. Shortcomings of legacy communication channels include being overly complex, using too much bandwidth in the vehicle, having limited scalability and updateability, and, in some cases, having lower-than-desired levels of data security or privacy.

SUMMARY

The present technology solves the above and other challenges. In various embodiments, the technology provides a mechanism to pass to a local application, operating at a local communication system or connected accessory, vehicle information needed for function of the local application. The mechanism includes a link layer distinct to a communication layer enabling use of the local application in the vehicle, such as via a vehicle main display screen.

Example local communication systems include and are not limited to user smartphones, wearable devices, user plug-in devices, such as a USB mass storage device or dongle device, and such a device configured to communicate wirelessly.

In various embodiments, the host device is part of a vehicle comprising a universal serial bus (USB) port or any variant, such as wireless USB, and the portable system comprises a USB plug or wireless interface for mating with the vehicle.

A local communication system in some implementations includes an on-board device (OBD), such as a vehicle sensor system with which the vehicle is equipped with originally or retrofitted with after manufacture.

In one aspect, the technology includes a portable system, for use in projecting proprietary host-data-based output to a host device using a dual-layer proprietary-data-provision arrangement including the host device and the portable system. The portable system includes a hardware-based processing unit; and a non-transitory computer-readable storage component. The storage component has one or more first-layer components, of the dual-layer proprietary-data-provision arrangement, that, when executed by the hardware-based processing unit, communicate with the host device by way of a first wired communication channel or a first short-range wireless communication channel to receive the proprietary host data from the host device.

The storage component also includes a portable-system application that, when executed by the hardware-based processing unit, generates, based on the proprietary host data, proprietary host-data-based app output; and one or more second-layer components, of the dual-layer proprietary-data-provision arrangement, that, when executed by the hardware-based processing unit, communicate with the host device by way of a second wired communication channel or a second short-range wireless communication channel to provide the proprietary host-data-based app output to the host device for rendering at the host device.

The host device is, is part of, or includes a vehicle of transportation in various embodiments.

The proprietary host data includes any one or more of host-device dynamics information; host-device environmental information; and host-device navigation information, for example.

The one or more first-layer components of the dual-layer proprietary-data-provision arrangement comprise a host-device-hardware communication module. The host-device-hardware communication module includes an onboard diagnostics (OBD) module, for instance.

The one or more first-layer components of the dual-layer proprietary-data-provision arrangement comprise a host-interaction protocol client module.

The first wired communication channel and the first short-range wireless communication channel are distinct from the second wired communication channel and the second short-range wireless communication channel, respectively.

The first wired communication channel and the first short-range wireless communication channel are the same as the second wired communication channel and the second short-range wireless communication channel, respectively.

The first-layer components comprise a host-communications client module that, when executed by the hardware-based processing unit, receives the proprietary host data from the host device by way of the first wired or short-range wireless communication channel; and the second-layer components comprise a portable-system-projection server module that, when executed by the hardware-based processing unit (a) receives the proprietary host-data-based app output data from the portable-system application; and (b) sends the proprietary-host-data-based app output data to the host device by way of the second wired communication channel or the second short-range wireless communication channel for presentation at the host device.

In another aspect, the disclosure describes a host device, for projecting proprietary-host-data-based output utilizing a dual-layer proprietary-data-provision arrangement including a portable system and the host device. The host device includes a hardware-based processing unit; and a non-transitory computer-readable storage component. The storage includes one or more first-layer components, of the dual-layer proprietary-data-provision arrangement, that, when executed by the hardware-based processing unit, communicate with the portable system by way of a first short-range communication channel or a first wired communication channel.

The storage also includes one or more second-layer components, of the dual-layer proprietary-data-provision arrangement, that, when executed by the hardware-based processing unit, communicate with the portable system by way of a second wired communication channel or a second short-range wireless communication channel.

The first-layer components comprise a proprietary portable-system-communications server module that, when executed by the hardware-based processing unit, sends proprietary host data to the portable system by way of the first wired or short-range wireless communication channel.

And the second-layer components comprise a host-system-projection client module that, when executed by the hardware-based processing unit: (i) receives, from the portable system, by way of the wired communication channel or the short-range wireless communication channel, proprietary host-data-based portable-system app output generated at the portable system using the proprietary host data sent; and (ii) initiating presenting, by way of a host user-machine interface, host data output based on the proprietary-host-data-based portable-system app output.

In various embodiments, the one or more first-layer components comprise an onboard diagnostics (OBD) module and a host-device-interaction server module.

The one or more first-layer components may include a host-device-interaction server module and a host-device application-framework module.

Various aspects of the present technology includes the non-transitory computer-readable storage devices, of the portable systems and host devices, configured to perform any of the operations described, of the portable system or host device, algorithms to perform the same, and the processes including the operations performed by these systems, storage devices, and algorithms.

Other aspects of the present technology will be in part apparent and in part pointed out hereinafter.

The figures are not necessarily to scale and some features may be exaggerated or minimized, such as to show details of particular components.

DETAILED DESCRIPTION

As required, detailed embodiments of the present disclosure are disclosed herein. The disclosed embodiments are merely examples that may be embodied in various and alternative forms, and combinations thereof. As used herein, for example, exemplary, and similar terms, refer expansively to embodiments that serve as an illustration, specimen, model or pattern.

In some instances, well-known components, systems, materials or processes have not been described in detail in order to avoid obscuring the present disclosure. Specific structural and functional details disclosed herein are therefore not to be interpreted as limiting, but merely as a basis for the claims and as a representative basis for teaching one skilled in the art to employ the present disclosure.

I. Technology Introduction

The present disclosure describes, by various embodiments, systems for use with vehicle infotainment applications and, more specifically, to systems for aggregating vehicle data from infotainment application accessories. The technology provides a mechanism to pass to a local application, operating at a local communication system—such as a user mobile device or connected accessory—vehicle information needed for function of the local application. The mechanism includes a link layer distinct to a communication layer enabling use of the local application in the vehicle, such as via a vehicle main display screen.

While select embodiments of the present technology are described in connection with transportation vehicles or modes of travel, and particularly in some cases, automobiles, the technology is not limited to these implementations.

The concepts can be extended to a wide variety of systems and devices, such as other transportation or moving vehicles including aircraft, watercraft, trucks, busses, trolleys, trains, industries extending beyond transportation such as manufacturing equipment (for example, forklift), construction machines, and agricultural machinery, or of warehouse equipment, devices at the office, home appliances, personal or mobile computing devices, such as phones, wearables, plug-ins, and wireless peripherals, televisions, the like, and other.

Another non-automotive implementation includes plug-in peer-to-peer, or network-attached-storage (NAS) devices.

II. Example Arrangement and Environment—FIG. 1

Figure 1:
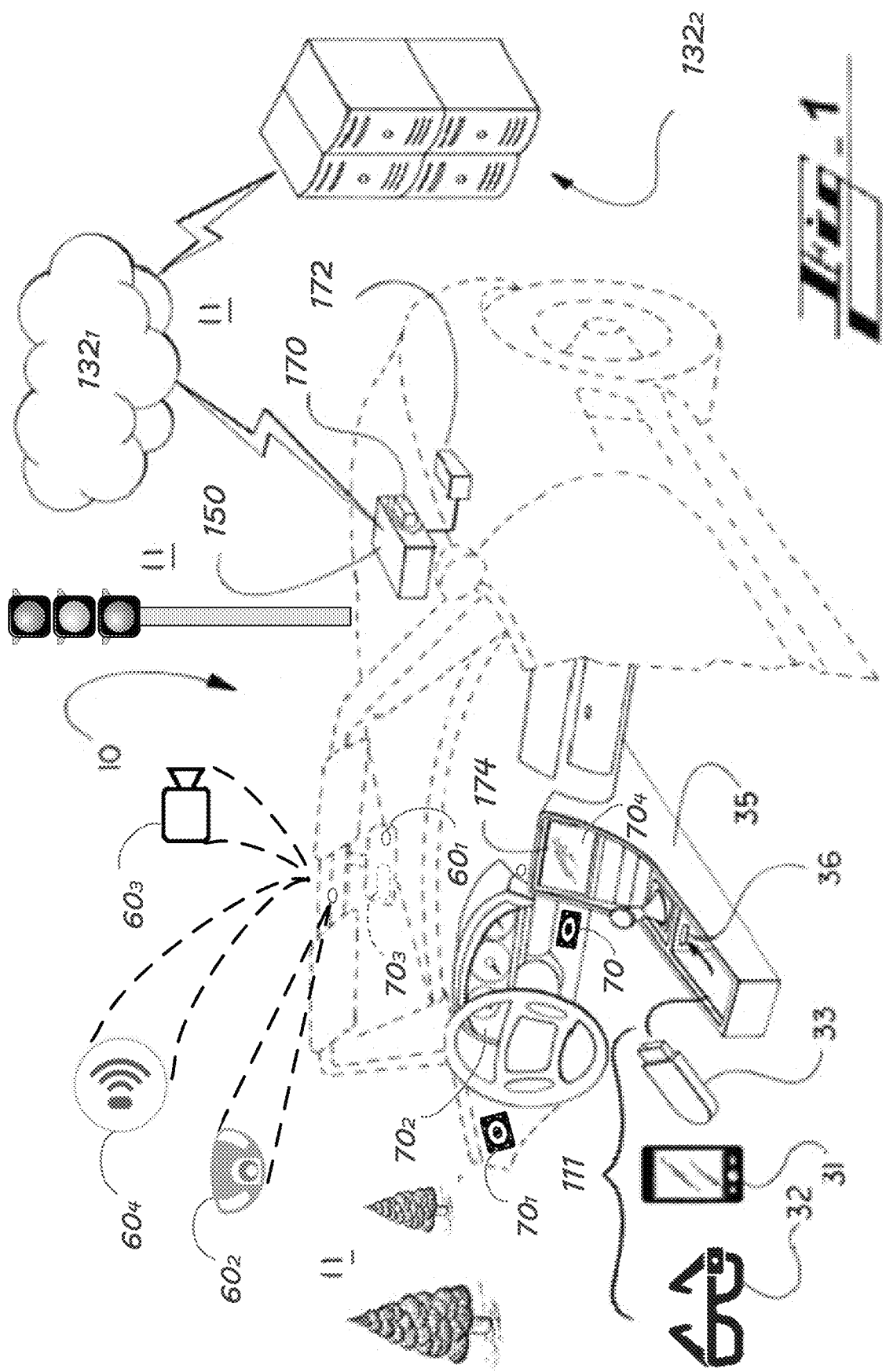
FIG. 1 illustrates schematically an example vehicle of transportation, with local and remote computing devices, according to embodiments of the present technology.

Turning now to the figures and more particularly the first figure, FIG. 1 shows an example host structure or apparatus 10 in the form of a vehicle.

The vehicle 10 includes a hardware-based controller or controller system 150. The hardware-based controller system 150 includes a communication sub-system, including input/output components, such as ported or wired components, and wireless components 170, for communicating with portable or local computing apparatus 111 and external networks 132$_1$. The portable or local apparatus 111 are referred to primary herein as portable, but may be embedded or connected to the vehicle 10.

The portable apparatus 111 is configured for wired or wireless communications with the host device 150 and in various embodiments, to other apparatus 132. Other apparatus may include external networks 132$_1$ and external or remote systems 132$_2$. By the external networks 132$_1$, such as the Internet, a local-area, cellular, or satellite network, vehicle-to-vehicle, pedestrian-to-vehicle, road-side infrastructure networks, the like or other, the vehicle 10 can reach portable or local apparatus 111 or remote systems 132$_2$, such as remote servers. A server of the remote system 132$_2$ may be a part of a customer-service center or system, such as the OnStar® system (ONSTAR is a registered trademark of Onstar LLC of Detroit, Mich.), for instance.

Example mobile or local devices 111 include a user smartphone 31, a user wearable device 32, and a USB mass storage device 33, and are not limited to these examples. Example wearables include smart watches, smart eyewear, and smart-jewelry (earrings, necklaces, lanyards, etc.).

Another example portable apparatus 111 is a user plug-in device, such as a USB mass storage device, or such a device configured to communicate wirelessly.

Still another example mobile or local device is an onboard device (OBD) (not shown in detail), such as a wheel sensor, a brake sensor, an accelerometer, a rotor-wear sensor, a throttle-position sensor, a steering-angle sensor, a revolutions-per-minute (RPM) indicator, a brake-torque sensors, other vehicle state or dynamics-related sensor for the vehicle, with which the vehicle is retrofitted with after manufacture. The OBD(s) can include or be a part of the sensor sub-system referenced below by numeral 172.

The vehicle controller system 150, which in contemplated embodiments includes one or more microcontrollers, can communicate with OBDs via a controller area network (CAN). The CAN message-based protocol is typically designed for multiplex electrical wiring with automobiles, and CAN infrastructure may include a CAN bus. The OBD can also be referred to as vehicle CAN interface (VCI) components or products, and the signals transferred by the CAN may be referred to as CAN signals. Communications between the OBD(s) and the primary controller or microcontroller 150 are in other embodiments executed via similar or other message-based protocol.

The vehicle 10 also has various mounting structures 35. The mounting structures 35 include a central console, a dashboard, and an instrument panel. In various embodiments, the mounting structures 35 include a plug-in port 36—a USB port, for instance—and a visual display 174, such as a touch-sensitive, input/output, human-machine interface (HMI).

The vehicle 10 also has a sensor sub-system 172 including sensors providing information to the controller system 150. The sensor input to the controller 150 is shown schematically at the right, under the vehicle hood, of FIG. 2. Example sensors having base numeral 60-$60_1$, $60_2$, $60_3$, $60_4$.

Sensor data relates to features such as vehicle operations, vehicle position, and vehicle pose, user characteristics, such as biometrics or physiological measures, and environmental-characteristics pertaining to a vehicle interior or outside of the vehicle 10.

Example sensors include a camera $60_1$ positioned in a rear-view mirror of the vehicle 10, a dome or ceiling camera $60_2$ positioned in a header of the vehicle 10, a world-facing camera $60_3$ (facing away from vehicle 10), and a world-facing range sensor $60_4$. Intra-vehicle-focused sensors $60_1$, $60_2$, such as cameras, and microphones, are configured to sense presence of people, activities or people, or other cabin activity or characteristics. The sensors can also be used for authentication purposes, in a registration or re-registration routine. This subset of sensors is described more below.

World-facing sensors $60_3$, $60_4$ sense characteristics about an environment 11 comprising, for instance, billboards, buildings, other vehicles, traffic signs, traffic lights, pedestrians, etc.

The OBDs mentioned can be considered as local devices, sensors of the sub-system 172, or both in various embodiments.

Any portable apparatus 111 (for instance, user phone 31, user wearable 32, or user plug-in device 33) is in various embodiments considered as a sensor of the sub-system 172 as well, such as in embodiments in which the vehicle 10 uses data provided by the portable apparatus 111 based on output of a local-device sensor(s). The vehicle system can use data from a user smartphone, for instance, indicating user-physiological data sensed by a biometric sensor of the phone.

The vehicle 10 also includes cabin output components 70, such as audio speakers $70_1$, and an instruments panel or display $70_2$. The output components may also include a dash or center-stack display screen $70_3$, a rear-view-mirror screen $70_4$ (for displaying imaging from a vehicle aft/backup camera), and any vehicle visual display device 174.

III. Embodiments of Host and Portable Apparatus—FIGS. 2-4

Figure 2:
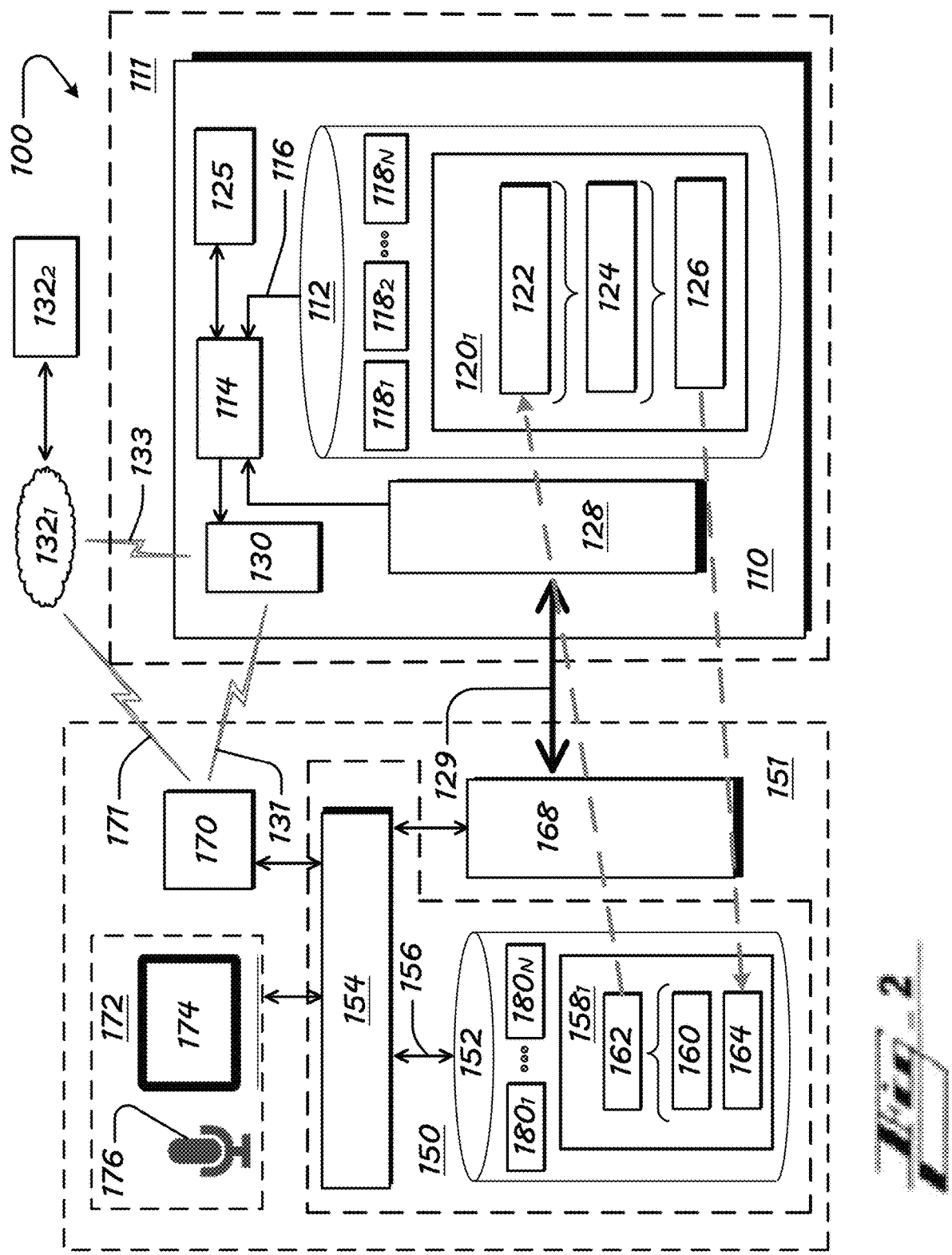
FIGS. 2-4 illustrate schematically arrangements in which the present technology is implemented, including various portable systems and host devices.
Figure 3:
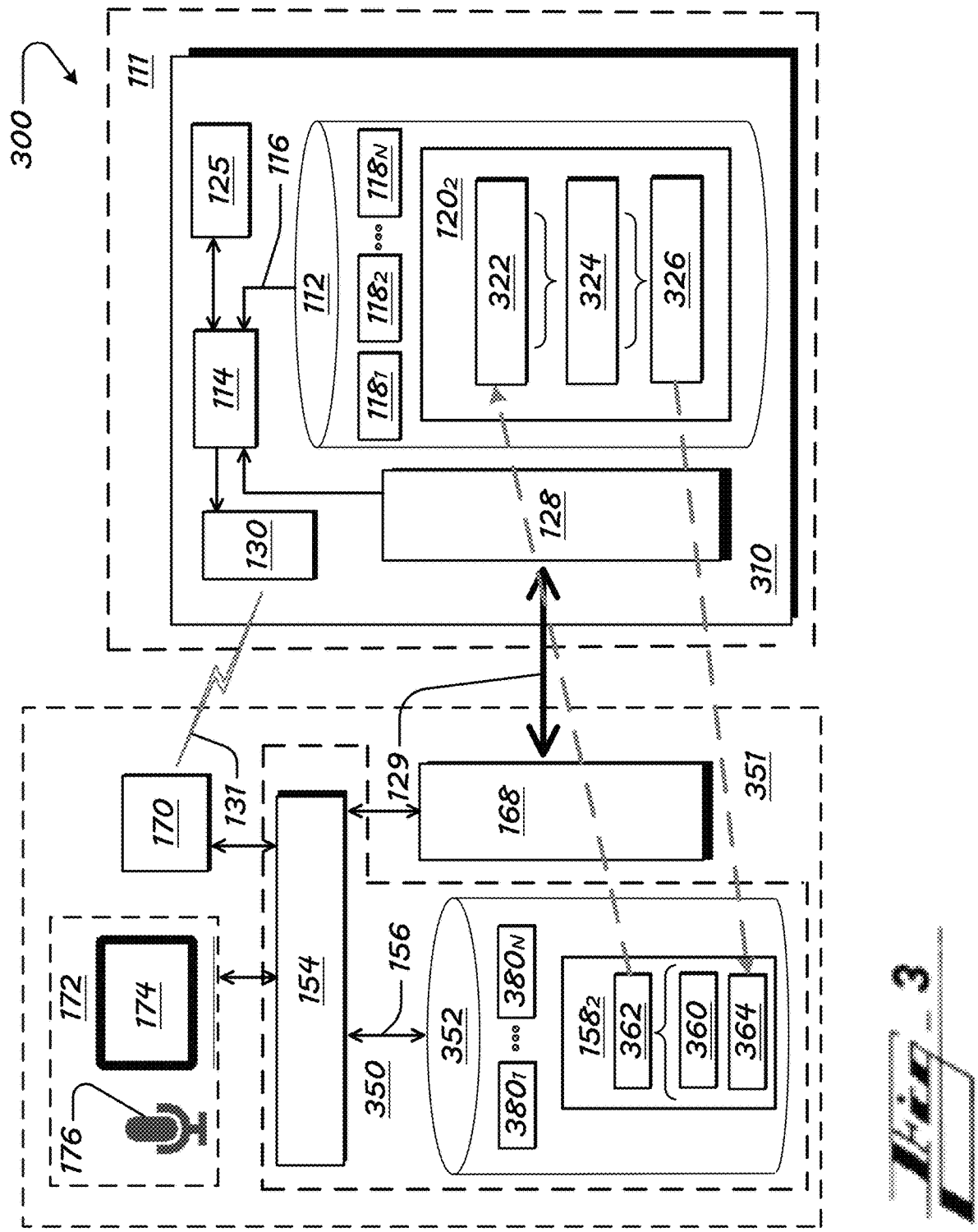
Figure 4:
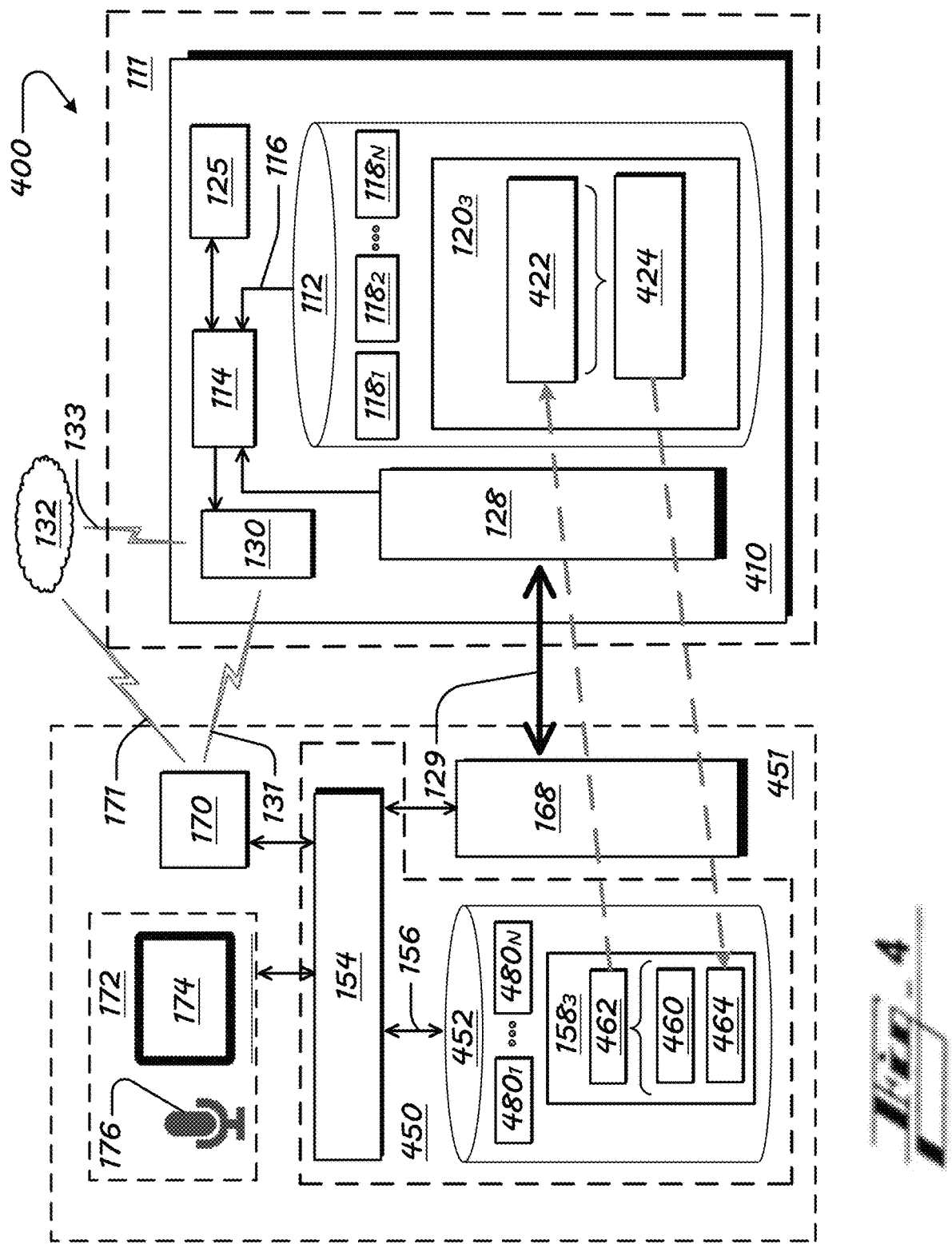

FIGS. 2-4 show various example architectures by which the present technology is implemented. The examples include various attachment structures: remote-link attachment (FIG. 2), OBD hardware (FIG. 3), and local-software-focused (FIG. 4).

III.A. FIG. 2—Remote-Link Embodiments

FIG. 2 shows an example environment 200 in which the present technology is implemented.

The environment 200 includes the portable apparatus 111 (e.g., plug-in device), including the portable system 110, and the host apparatus 10 (e.g., vehicle), including the host device 150.

In various embodiments, the portable apparatus 111 and host device 150 are a connected or consolidated system.

III.A.1. Portable Apparatus 111 with Remote-Link Structures

The portable apparatus 111 can take any of many forms, and be referenced in any of a variety of other ways—such as by peripheral device, peripheral system, connected mobile, or portable accessory or peripheral, peripheral, mobile system, mobile peripheral, portable system, and portable mass-storage system, such as a smartphone, or a user smart wearable device.

The portable apparatus 111 can be referred to as being portable based on any features, such as by being readily attachable and removable to/from the host device, such as by a plug-in arrangement. Or by being mobile, such as by being wireless and compact for being readily carried about by a user. The portable apparatus or apparatus 111 can include or be part of another apparatus 111 such as dongle or a mobile communications device such as a smartphone.

For some embodiments, instead of the portable apparatus 111 being portable, the portable apparatus 111 is local or embedded and, still, provides content and any rendering instructions to the host device. The portable apparatus 111 can be part of or connected to the host device, or part of or connected to a vehicle (e.g., automobile) including the host device 150.

While the portable apparatus 111 is described primarily herein as a portable apparatus 111, any of the embodiments described regarding a portable apparatus 111 disclose inherently embodiments in which the apparatus 111 is local or embedded.

Although connections are not shown between all of the components of the portable apparatus 111 and the host device 150, the components interact with each other to carry out the functions described herein.

The portable apparatus 111 includes a hardware-based portable system 110.

The portable system 110 includes a hardware-based storage device 112. The hardware-based storage device 112 can be referred to by other terms, such as a memory, or computer-readable medium, and can include, e.g., volatile medium, non-volatile medium, removable medium, and non-removable medium. The term hardware-based storage device and variants thereof, as used in the specification and claims, refer to tangible or non-transitory, computer-readable storage devices. The component is referred to primarily herein as a hardware-based storage device 112.

In some embodiments, storage media 112 includes volatile and/or non-volatile, removable, and/or non-removable media, such as, for example, random access memory (RAM), read-only memory (ROM), electrically erasable programmable read-only memory (EEPROM), solid state memory or other memory technology, CD ROM, DVD, BLU-RAY, or other optical disk storage, magnetic tape, magnetic disk storage or other magnetic storage devices.

The portable system 110 also includes a processing hardware unit 114 connected or connectable to the hardware-based storage device 112 by way of a communication link 116, such as a computer bus.

The processing hardware unit 114 can be referred to by other terms, such as processing hardware unit, processing hardware device, processing hardware system, processing unit, processing device, or the like.

The processing hardware unit 114 could be multiple processors, which could include distributed processors or parallel processors in a single machine or multiple machines. The processing hardware unit 114 can be used in supporting a virtual processing environment.

The processing hardware unit 114 can include or be a multicore unit, such as a multicore digital signal processor (DSP) unit or multicore graphics processing unit (GPU).

The processing hardware unit 114 can be used in supporting a virtual processing environment. The processing hardware unit 114 could include a state machine, application specific integrated circuit (ASIC), programmable gate array (PGA) including a Field PGA (FPGA), DSP, GPU, or state machine.

The portable system 110 in various embodiments comprises one or more complementing media codec components, such as a processing or hardware component, and a software component to be used in the processing. The hardware or processing component can be a part of the processing hardware unit 114.

References herein to a processor or processing hardware unit 114 executing code or instructions to perform operations, acts, tasks, functions, steps, or the like, could include the unit 114 performing the operations directly and/or facilitating, directing, or cooperating with another device or component to perform the operations.

The hardware-based storage device 112 includes structures such as modules, engines, and components, which include computer-executable instructions or code for performing functions of the present technology. The modules, engines, and components are each referred to primarily herein as modules.

Code, whether part of the modules, is executed by the processing hardware unit 114 to cause the processing hardware unit and thus the portable system 110 to perform any combination of the operations described herein regarding the portable system. Example operations include running an application, and therein receiving media content from a source, such as a third-party application server, and delivering content and any rendering instructions to the host device.

Modules can cause the processing hardware unit 114 to perform specific operations or routines of module functions.

Each of the modules and sub-modules can be referred to by any of a variety of names, such as by a term or phrase indicative of its function.

The structures of the hardware-based storage device 112 in various embodiments includes any of:

Applications 118$_1$, 118$_2$, . . . , 118$_N$ (one or more, wherein N is a positive non-zero integer);

Synchronization module 120$_1$, first embodiment (second and third embodiments illustrated in FIGS. 3 and 4);

Remote-server-communications client sub-module 122—e.g., an OnStar RemoteLink client sub-module (ONSTAR REMOTELINK is a registered trademark of OnStar LLC, of Detroit, Mich.);

Host-interaction protocol (e.g., vehicle-interaction protocol VIP) client sub-module 124, or portable host-device-data (e.g., vehicle-data) rendering module 124; and Portable-system-projection server sub-module 126—e.g., phone-projection server sub-module.

The applications 118 are in various embodiments made or provided by an original equipment manufacturer (OEM) of the host device, e.g., automobile. The applications 118 can be proprietary in any one or more of a variety of ways, such as by:

(1) being configured only for use with a particular type of host device 150, such as a host device made by the OEM, (2) being configured only for use with a particular type of portable system, such as a portable system made by the OEM, (3) being configured for use only with portable systems approved by the OEM for the use, and (4) being configured for use only with host devices approved for the use by the OEM.

The hardware-based storage device 112 in various embodiments includes a file sub-system (not shown in detail), which can include a first level cache and in some implementations also a second level cache.

The hardware-based storage device 112 in various embodiments includes a media codec component (not shown in detail), such as a processing, or hardware, component, and a software component.

The hardware-based storage device 112 in various embodiments includes a framebuffer capture component (not shown in detail). A display screen framebuffer can be, for example, a transferred video source, such as in the form of a data content package, captured by the framebuffer capture component.

The device 112 in various embodiments stores at least some of the data received and/or generated, and to be used in processing, in a file-based arrangement corresponding to the code stored therein. For instance, when an FPGA is used, the hardware-based storage device 112 can include configuration files configured for processing by the FPGA.

Any of the hardware-based storage device 112 components may be combined, separated, or removed. References herein to portable-system operations performed in response to execution of any memory 112 component can be performed by execution of another, or a combined or separated, memory 112 component. For instance, if instructions of a first component of code is described as being configured to cause the processing hardware unit 114 to perform a certain operation or set of operations, instructions of another component of the memory, including or fully distinct form the first code, 112 can be configured to cause the processing hardware unit 114 to perform the operation(s).

In some embodiments, the hardware-based storage device 112 includes code of a dynamic programming language (not called out in detail in the drawings), such as JavaScript, Java or a C/C++ programming language. The host device 150 includes the same programming language. The programming-language component of the host device 150, in some implementations includes an application framework, such as the media application mentioned and/or an application manager for managing operations of the media application at the host device 150.

The programming language code (PLC) can define settings for communications between the portable system 110 and the host device 150, such as features of one or more application program interfaces (APIs) by which the portable system 110 and the host device 150 communicate.

The portable apparatus 111 in some embodiments includes at least one human-machine interface (HMI) component 125. For implementations in which the interface component 125 facilitates user input to the processing hardware unit 114 and output from the processing hardware unit 114 directly to the user from the portable system 10, the interface component 125 can be referred to as an input/output (I/O) component.

As examples, the interface component 125 can include, or be connected to, a sensor configured in any of a variety of ways to receive user input. In various implementations the interface component 125 includes at least one sensor configured to detect user input provided by, for instance, a touch, an audible sound or a non-touch motion or gesture.

A touch-sensor interface component can include a mechanical actuator, for translating mechanical motion of a moving part or touch of a touch-sensitive sensor, such as a mechanical knob or button, to an electrical or digital signal. A touch sensor can also include a touch-sensitive pad or screen, such as a surface-capacitance sensor. The interface component 125 can include a microphone. The interface component 125 can also include infrared components of a touch-sensor interface, as well.

For detecting gestures, the interface component 125 can include or use a projected-capacitance sensor, an infrared laser sub-system, a radar sub-system, or a camera sub-system, by way of examples.

The interface component 125 is connected to the processing hardware unit 114 for passing user input received as corresponding signals or messages to the hardware-based processing unit.

In various implementations the interface component 125 includes or is connected to any suitable output devices—for example, a visual or audible indicator such as a light, digital display, or tone generator, for communicating output to the user.

The interface component 125 can be used to affect functions and settings of one or both of the portable apparatus 111 and the host device 150 based on user input. Signals or messages corresponding to inputs received by the interface component 125 are transferred to the processing hardware unit 114, which, executing code of the hardware-based storage device 112, sets or alters a function at the portable system 110.

Inputs received can also trigger generation of a communication, such as an instruction or message, for the host device 150, and sending the communication to the host device 150 for setting or altering a function or setting of the host device 150.

The portable apparatus 111 is in some embodiments configured to connect to the host device 150 by a wireless communication 131 or by a hard, or wired connection 129. The wired connection is referred to primarily herein as being wired in a non-limiting sense. The connection can include components connecting wires, such as the USB plug-and-port arrangement described, or wireless components can include as wireless USB.

In some embodiments, the connection is configured according to higher throughput arrangements, such as using an HDMI port or a VGA port.

In various embodiments, wired communications are effected between a data-communications plug 128 of the portable system 10 and a matching data-communications port 168 of the host device 150.

The portable apparatus 111 can, as mentioned, be configured as a dongle, in which case an example data-communications plug 128 is a USB plug, for connecting to a USB port 168 of the host device 150.

In these ways, advanced functions can be made available by way of a relatively low-rate connection, such as USB device class components, whereas they would not otherwise be. And if a higher- or high-capability class device is available (e.g., if the vehicle is already configured with or for such device class), the system can be configured to directly use the higher-capability class device to provide the advanced functions.

While the portable apparatus 111 is in some embodiments a portable mass-storage device, more advanced USB device classes such as Media Transfer Protocol (MTP) could be supported.

The portable system 1101 is configured in various embodiments to operate any one or more of a variety of types of computer instructions that it may be programmed with for dynamic operations and/or that it may receive for dynamic processing at the portable system 110.

By numeral 130 in FIG. 2 is referenced a wireless input or input/output (I/O) device—e.g., transceiver—or simply a transmitter. Numerals 131, 133 reference respectively wireless communications with the host device 150 and external apparatus 132—external networks $132_1$ (Internet, etc.) and remote systems $132_2$ (servers, etc.).

The wireless device 130 in various embodiments communicates with any of a wide variety of networks, including cellular communication networks, satellite networks, and local networks such as by way of a roadside-infrastructure or other local wireless transceiver, beacon, or hotspot.

The wireless device 130 can also communicate with near-field communication (NFC) devices to support functions such as mobile payment processing, or communication setup/handover functions, or any other use cases that are enabled by NFC. The wireless device 130 can include for example, a radio modem for communication with cellular communication networks.

The portable-system synchronization module $120_1$ performs various functions of the arrangement 200 at the portable system 110. The portable-system synchronization module $120_1$ includes or is connected to any of the mentioned remote-server-communications client sub-module 122, the host-interaction protocol (e.g., vehicle-interaction protocol VIP) client sub-module 124, and the portable-system-projection server sub-module 126.

The portable-system synchronization module $120_1$ includes code or protocols that when executed by the processing hardware unit 114 performs any suitable functions for establishing connection, such as by handshake processes, synchronizing, or otherwise facilitating and managing communications, between the portable apparatus 111 and the host device 150. The module $120_1$ can include or work with media or infotainment-sharing app(s) 118 at the portable system 110, such as a video-sharing app at the portable system 110. The portable-system synchronization system $120_1$ in various embodiments communicates with the host-system synchronization module $158_1$.

The remote-server-communications client sub-module 122 in various embodiments includes an OnStar RemoteLink client sub-module (ONSTAR REMOTELINK is a registered trademark of OnStar LLC, of Detroit, Mich.).

In operation, the portable-system-app client sub-module 122 receives data from the remote system $132_2$, via the wireless device 130. Data received in various implementations includes host-device data, such as vehicle data if the host is a vehicle. The host data is received from the host device at, processed by, and passed along from, the remote system $132_2$.

The remote-server-communications client sub-module 122 (e.g., vehicle communication sub-module, such as an OBD sub-module) in various embodiments performs functions including decoding and any other suitable data processing on the received host-device data.

The host-device data includes any information related to the host device 150—e.g., vehicle or vehicle operations—that may be useful to an application(s) $118_N$ operating at the portable system 110. Example vehicle data includes:

- vehicle dynamics information, such as vehicle speed, heading, and acceleration;
- vehicle environmental information, such as information about a road surface, local objects, temperature, lighting, weather; and
- navigation information, such as route or traffic data.

In some embodiments, data received to the portable system from the remote or external network 132 includes media or infotainment data. The data is received from a remote media and/or infotainment server, for instance. The data is processed by any of the portable system app(s) 118, the remote-server-communications client sub-module 122 (e.g., OnStar RemoteLink client sub-module), and the host-interaction protocol (e.g., vehicle-interaction protocol VIP) client sub-module 124, for rendering via a portable-system HMI component 125 and/or via a host-device HMI 174.

The host-interaction protocol (e.g., vehicle-interaction protocol VIP) client sub-module 124 performs any suitable functions for preparing the host data received (e.g., vehicle data) for use at the portable system 110 and/or at the host device 150.

While the term vehicle-interaction protocol (VIP) is used at places herein to describe structure and functions, the corresponding structure and functions are not limited to being used in connection with a vehicle.

The VIP client sub-module 124 may, with or separate from one of the application 118, prepare vehicle data for rendering for user consumption, at the portable system 110 (e.g., portable system speaker or screen) and/or for rendering at the host device 150.

The portable-system-projection server sub-module 126 interfaces directly with the host device 150, by wired or wireless connection, for sharing portable-system output, such as output of a portable-system app using the host-device (e.g., vehicle) data received from the host device 150, via the remote system $132_2$ and upon receipt processing also at the remote-server-communications client sub-module 122 (e.g., OnStar RemoteLink client sub-module) and the vehicle-interaction protocol (VIP) client sub-module 124.

In various embodiments, functions in the implementation of FIG. 2 include executing VIP, remote-link-type, and/or applications and protocols—e.g., VIP module including a RemoteLink® mobile device app) to coordinate data-processing and data-sharing operations at the portable system 110 and between the host device 150 and the portable system 110.

The applications 118 are in various embodiments background apps, such as a non-customer facing app. As an example, such a background app could be a data collection app, or an app that performs certain actions behind the scenes, not directly visible to the customer, based on input such as vehicle data. More particular examples include an app that send an external signal (e.g., garage-door-open command or turn-on exterior house lights command). Another particular example is an internal signal generating app, such as one initiating adjustment of vehicle interior lighting or vehicle audio volume. A background app may also have the ability to bring itself to the foreground, e.g., to provide a customer notification, or generate a user prompt.

The applications 118 can also include foreground app, such as more traditional foreground app interacting with the customer.

the synchronization module $120_1$;
Remote-server-communications client sub-module 122 (e.g., OnStar RemoteLink client sub-module)
Vehicle-interaction protocol (VIP) client sub-module 124; and
Portable-system-projection server sub-module 126]

III.A.2. Host Device 150 with Remote-Link Structures

The host device 150 is, in some embodiments, part of a greater system 151, such as an automobile or other vehicle 10 (FIG. 1).

As shown, the host device 150 includes a memory, or computer-readable medium 152, such as volatile medium, non-volatile medium, removable medium, and non-removable medium. The term computer-readable media and variants thereof, as used in the specification and claims, refer to tangible or non-transitory, computer-readable storage devices. The component is referred to primarily herein as a storage device 152.

In some embodiments, storage device 152 includes volatile and/or non-volatile, removable, and/or non-removable media, such as, for example, random access memory (RAM), read-only memory (ROM), electrically erasable programmable read-only memory (EEPROM), solid state memory or other memory technology, CD ROM, DVD, BLU-RAY, or other optical disk storage, magnetic tape, magnetic disk storage or other magnetic storage devices.

The host device 150 also includes an embedded computer hardware-based processing unit 154 connected or connectable to the storage device 152 by way of a communication link 156, such as a computer bus.

The hardware-based processing unit could be multiple processors, which could include distributed processors or parallel processors in a single machine or multiple machines. The hardware-based processing unit can be used in supporting a virtual processing environment. The hardware-based processing unit could include a state machine, application specific integrated circuit (ASIC), programmable gate array (PGA) including a Field PGA, or state machine. References herein to hardware-based processing unit executing code or instructions to perform operations, acts, tasks, functions, steps, or the like, could include the hardware-based processing unit 154 performing the operations directly and/or facilitating, directing, or cooperating with another device or component to perform the operations.

The storage device 152 in various embodiments stores at least some of the data received and/or generated, and to be used in processing, in a file-based arrangement corresponding to the code stored therein. For instance, when an FPGA is used, the hardware-based storage device 152 can include configuration files configured for processing by the FPGA.

The storage device 152 includes computer-executable instructions, or code. The computer-executable code is executable by the hardware-based processing unit 154 to cause the hardware-based processing unit, and thus the host device 150, to perform any combination of the functions described in the present disclosure regarding the host device 150.

The storage unit 152 of the host device 150 in various embodiments includes an application(s) framework or module, an audio-media module, a framebuffer or visual-media module, and a HMI module, which are all considered illustrated by the schematically shown storage unit 152.

The storage device 152 of the host device 150 in various embodiments also includes any of: other code or data structures, such as a file sub-system; and a dynamic-programming-language (e.g., JavaScript, Java or a C/C++ programming language—not shown in detail in the figures).

Any such storage-unit components may be combined, separated, or removed. References herein to host system operations performed in response to execution of any storage-unit component can be performed by execution of another, or a combined or separated, memory component. For instance, if first code is described as being configured to cause the hardware-based processing unit 154 to perform a certain operation or set of operation(s), other code, including or fully distinct form the first code, can be configured to cause the hardware-based processing unit 154 to perform the operation(s).

The file sub-system can include a first level cache and a second level cache. The file sub-system can be used to store media, such as video or image files, before the hardware-based processing unit 154 publishes the file(s).

The dynamic-programming-language (e.g., JavaScript, Java or a C/C++ programming language (not shown in detail) and/or application framework can be part of the second level cache. The dynamic-programming-language is used to process media data, such as image or video data, received from the portable system 110. The programming language code can define settings for communications between the portable system 110 and the host device 150, such as characteristics of one or more APIs.

Structures of the hardware-based storage device 152 of the host device 150 in various embodiments includes any of:
Host-device application(s) $180_1, \ldots, 180_N$.
Host-device synchronization module $158_1$, first implementation (second and third implementations illustrated in FIGS. 3 and 4);
Host-interaction protocol (e.g., vehicle-interaction protocol VIP) server sub-module 160, or host-device-data (e.g., vehicle-data) rendering module 160; and
Host-interaction protocol (e.g., vehicle-interaction protocol VIP) remote-link sub-module 162—e.g., VIP via RemoteLink sub-module corresponding to the remote-server-communications client sub-module 122 of the portable system 110 and a RemoteLink server, or program operated, at the remote system $132_2$.
Host-device-projection client sub-module 164—e.g., phone-projection client sub-module.

As with the application/s $118_N$ of the portable system 110, the applications 180 of the host device 150 are in various embodiments made or provided by an original equipment manufacturer (OEM) of the host device, e.g., automobile. The applications 118 can be proprietary in any one or more of a variety of ways, such as by:
(1) being available only on particular host devices made by the OEM;
(2) being available only on particular host devices approved by the OEM, and so specially configured for authorized use at the host device, e.g., vehicle, with authorized portable systems 111; and
(3) regarding communications with external devices or external-device apps, being compatible for communication with only external devices (e.g., the portable apparatus 111), and/or external-device apps thereof, that are approved by the OEM, and thereafter configured specially for authorized interaction with the host device 150 or parts thereof.

The host-device synchronization module $158_1$ performs functions at the host-device side (e.g., vehicle side) for executing the arrangement 200 of the present technology. As mentioned, functions of the arrangement in various embodiments includes executing VIP, RemoteLink, or similar applications and protocols to coordinate data-processing and data-sharing operations using two separate link layers between the host device 150 and the portable system 110.

The host-device synchronization module $158_1$ may include or be in communication with any of the VIP remote-link sub-module 162, the VIP server sub-module 160, and the host-device-projection client sub-module 164.

The host-system synchronization module $158_1$ includes code or protocols that when executed by the processing hardware unit 154 performs any suitable functions for establishing connection, such as by handshake processes, synchronizing, or otherwise facilitating and managing communications, between the portable system 110 and the host device 150.

The module $158_1$ can include or work with media or infotainment-rendering app(s) ($180_N$) at the host device 150, such as a video-rendering app. The host-system synchronization module $158_1$ in various embodiments communicates with the portable-system synchronization module $120_1$.

The VIP server sub-module 160 (or vehicle-side host-device-data (e.g., vehicle-data) rendering module) requests and receives, or otherwise obtains, host-device data (e.g., vehicle data) to be used by the portable system 110. The host-device data may, as mentioned, include any information related to the vehicle or vehicle operations that may be useful to an application(s) $118_N$ operating at the portable system 110. Example vehicle data includes:
vehicle dynamics information, such as vehicle speed, heading, and acceleration;
vehicle environmental information, such as information about a road surface, local objects, temperature, lighting, weather; and
navigation information, such as route or traffic data.

The VIP server sub-module 160 processes the host-device data in any suitable manner for presentation via the VIP remote-link sub-module 162, and the remote system $132_2$, to the portable system 110. The VIP remote-link sub-module 162 processes the data received from the VIP server sub-module 160 for presentation to the remote system $132_2$, such as an OnStar® server using the OnStar RemoteLink®, or any other suitable protocol. The server $132_2$ may be configured with a management system, such as an OnStar RemoteLink® management system for use in managing, facilitating, or otherwise effecting VIP functions or other functions including at least secure and efficient data transfer from the host device 150 to the portable system 110. Transfer to the portable system 110, via the remote server $132_2$, is indicated schematically by dashed line in FIG. 2, and uses the wireless component 170.

The VIP remote-link sub-module 162 in various embodiments supports interaction between the host device 150 and the portable apparatus 111. This may be done, for instance, by the sub-module 162 constructing and transmitting messages that communicate user input data, such as touch input (e.g., x, y screen touch data, indicating where the user touched the screen) or voice data—e.g., binary data encoded using a pulse-code (PCM) modulation scheme or ASCII data that has been provided by a speech-to-text system. This type of function may be referred to as a back channel interface, supporting a primary, forward, channel projection system, such as by enabling dialog between the application and the user.

The VIP server sub-module 162 can in any way be like any of the other interface modules for sending host-device data to the portable system 110 (e.g., modules 362, 462) described herein.

As referenced regarding FIG. 1 and shown in FIG. 2, the host device 150 also includes or is in communication with the one or more mentioned interface components 172, as sensors, and an HMI component, in various embodiments. For implementations in which the components 172 facilitate user input to the hardware-based processing unit 154 and output from the hardware-based processing unit 154 to the user, the components can be referred to as input/output (I/O) components.

For output, the interface components 172 can include a visual-output or display component 174, such as a screen, and an audio output such as a speaker. In a contemplated embodiment, the interface components 172 include structure for providing tactile or haptic output, such as a vibration to be sensed by a user, such as by way of a steering wheel or vehicle seat to be sensed by an automobile driver.

The interface components 172 are configured in any of a variety of ways to receive user input. The interface components 172 can include for input to the host device 150, for instance, a mechanical or electro-mechanical sensor device such as a touch-sensitive display, which can be referenced by numeral 174, and/or an audio device 176 such as an audio sensor—e.g., microphone—or audio output such as a speaker. In various implementations, the interface components 172 includes at least one sensor. The sensor is configured to detect user input provided by, for instance, touch, audibly, and/or by user non-touch motion, such as by gesture.

A touch-sensor interface component can include a mechanical actuator, for translating mechanical motion of a moving part such as a mechanical button, to an electrical or digital signal. The touch sensor can also include a touch-sensitive pad or screen, such as a surface-capacitance sensor. For detecting gestures, an interface component 172 can use a projected-capacitance sensor, an infrared laser sub-system, a radar sub-system, or a camera sub-system, for example.

The interface component 172 can be used to receive user input for affecting functions and settings of one or both of the portable system 110 and the host device 150. Signals or messages corresponding to user inputs are generated at the component 172 and passed to the hardware-based processing unit 154, which, executing code of the storage device 152, sets or alters a function or setting at the host device 150, or generates a communication for the portable system 110, such as an instruction or message, and sends the communication to the portable system 110 for setting or altering a function or setting of the portable system 110. An example setting or function includes how media is provided to or from the host device or how media is rendered or otherwise processed at the portable apparatus 111 or the host device 150. Another example setting includes how host data (e.g., vehicle data) is formatted, or how collected or provided, such as regarding an interval at which vehicle data is obtained or shared between the portable apparatus 111 and host device 150.

The host device 150 is in some embodiments configured to connect to the portable apparatus 111 by wired connection 129. The host device 150 is in a particular embodiment configured with or connected to a data-communications port 168 matching the data-communications plug 128 of the portable apparatus 111. An example plug/port arrangement provided is the USB arrangement mentioned.

In some embodiments, the host device 150 is configured for wireless communications 131 with the portable apparatus 111. A wireless input, or input/output (I/O) device—e.g., transceiver—of the host device 150 is referenced by numeral 170 in FIG. 1. The hardware-based processing unit 154, executing code of the storage device 152, can wirelessly send and receive information, such as messages or packetized data, to and from the portable apparatus 111 and the external apparatus 132 [external networks $132_1$ (Internet, etc.) and remote systems $132_2$ (servers, etc.)] by way of the wireless device 170 as indicated by numerals 131, 171, respectively. Any of various wireless protocols can be used, such as but not limited to Bluetooth, or wireless USB.

III.A.3. Summary and Select Benefits of Arrangement 200

This arrangement 200 provides a secure and efficient mechanism to pass, to an application(s) $118_N$ hosted on the portable apparatus 111, host-device information requisite for function of the application, such as vehicle speed or altitude information. The interaction allows transport the host-device information by way of a first link layer or protocol, being a different link layer than a second link layer or protocol, such as a phone-projection layer connecting the portable apparatus 111 and an automobile host device, by which the portable apparatus 111 provides function via the host device 150. The function may provide output to a vehicle driver using a main automobile display for displaying information to the vehicle driver, for instance.

The first link layer or protocol is in various embodiments a proprietary layer or protocol, such as between an OEM-made host device 150 and an OEM-made portable system application. By this first link layer, proprietary, or highly-secure, host device data (e.g., vehicle data), which is conventionally not shared outside of current vehicles, is shared securely with a portable system 310 in communication with the host device 350.

The second link layer or protocol may be an open layer, or another proprietary layer or protocol distinct from the first layer or protocol. The first may be a proprietary layer or protocol provided by the OEM, and the second layer or protocol may be a third-party layer or protocol, created by a third-party company.

The first and second link layers, or protocols, can be viewed as parallel connected transport layers between the portable apparatus 111 and the host device 150.

The first-layer sub-modules 162, 160 of the portable apparatus 111 and the host device 150 are in various embodiments configured to emulate a single-layer, or single-connection, communication technology by which the portable apparatus 111 would receive host-device data from the host device 150 and after processing the same, using a portable-system application/s $118_N$, deliver output for consumption by a user via the host device 150—e.g., automobile display and/or audio system.

The arrangement 200 provides a secure and efficient manner for the host device 150 and portable apparatus 111 to interface, for providing various services, such as host-data-related (e.g., vehicle-data-related) services from the portable apparatus 111 based on host data (e.g., vehicle data) provided to the apparatus 111 via the specialized remote server. Coordinating components include versions of a remote link (e.g., ONSTAR RemoteLink) application or program at the portable apparatus 111, the host device 150, and the remote or external system $132_2$.

For security, data transmissions and/or the data shared between the host device 150 and the external or remote system 132$_2$ are protected in any suitable manner, such as by encryption, as are transmissions between the remote system and portable apparatus 111.

The host device 150 and portable apparatus 111 interface to emulate next-generation technology expected to be present on future apparatus, e.g., future vehicle models. The portable apparatus 111 in various embodiments augments the host device 150 at least by being functionally equivalent to the next-generation embedded device(s) that are or are to be available on next generation products—e.g., next-gen vehicles. This approach allows the host vehicle to share host data—such as vehicle data, and in some embodiments particularly proprietary or highly-sensitive vehicle data, directly with portable apparatus 111, such as by wired or wireless connection—and by a single channel or layer of interaction. Previously, add-on devices could only be integrated into vehicles using open interfaces that were not designed to support a deep level of integration required for a seamless customer experience. Such an approach results in a disjointed customer experience due to undesirably high level of separation between the two systems. The proposed approach enables comprehensive data sharing between host device 150 and portable apparatus 111 to create a single virtual platform.

The host device 150 and portable apparatus 111 of the present technology work together as if they 111, 150 had the mentioned next-generation technology allowing the single-layer interaction, for enabling portable-system app functions using host-device data, except by the present embodiments, the two described layers are used instead of a single layer.

By the arrangement, vehicles and/or portable systems lacking technology enabling the single-layer functioning, which can be referred to as legacy vehicles and portable systems, can be improved to perform the same functioning using multiple layers.

The arrangements in various embodiments establish a bridge between custom mobile app products—e.g., applications 118$_N$—operating at the portable system 111, which may be provided by the host (e.g., vehicle) OEM, and the OEM vehicles, allowing private and secure exchange from the host to the portable apps of sensitive host data (e.g., vehicle data) using a secure private, or proprietary, channel in tandem with using a partner-based technology standards for less-sensitive data for data transfer from the portable system to the host, such as for portable system/accessory/peripheral projection functions. The projection functions can include any known such function, such as presenting media, navigation, or information to the user (e.g., vehicle driver or passenger) via the host device interface 172—e.g., vehicle display screen and/or speakers, and in various embodiments the user can control the subject application/s 118$_N$ and/or subject functions of the host device via the host-device interface 172, such as touch-sensitive display screen.

The mentioned partner-based technology may include, e.g., protocols that the OEM develops with, purchases from, licenses from, etc., a partner, and/or approves use of the same with the host device. An example is a USB wireless connection between the host device and portable system.

By changing or making the portable system and host device according to the embodiments of the present technology, little to no expensive changes are needed to the hardware, operating system, or other software of the host (e.g., vehicle) and portable system, while enabling the next generation performance referenced.

The arrangements in various embodiments establish a bridge between custom mobile app products—e.g., applications 118$_N$—operating at the portable system 111, which may be provided by the host (e.g., vehicle) OEM, and the OEM vehicles, allowing private and secure exchange from the host to the portable apps of sensitive host data (e.g., vehicle data) using a secure private, or proprietary, channel in tandem with using a partner-based technology standards for less-sensitive data for data transfer from the portable system to the host, such as for phone projection functions, such as for portable system/accessory/peripheral projection functions. The projection functions can include any known such function, such as presenting media, navigation, or information to the user (e.g., vehicle driver or passenger) via the host device interface 172—e.g., vehicle display screen and/or speakers, and in various embodiments the user can control the subject application/s 118$_N$ and/or subject functions of the host device via the host-device interface 172, such as touch-sensitive display screen.

The partner-based technology may include, e.g., protocols that the OEM develops with, purchases from, licenses from, etc., a partner, and/or approves use of the same with the host device. An example is a USB wireless connection between the host device and portable system.

By changing or making the portable system and host device according to the embodiments of the present technology, little to no expensive changes are needed to the hardware, operating system, or other software of the host (e.g., vehicle) and portable system, while enabling the next generation performance referenced.

III.B. FIG. 3—OBD or Other Host Hardware Embodiments

FIG. 3 shows another example arrangement 300, like the remote-link embodiments of FIG. 2. Differences between the embodiments described above in connection with FIG. 2 and the embodiments of FIG. 3 include those of FIG. 3 having, instead of the remote-link components of FIG. 2, the host device and portable system have communicating hardware/software components that communicate directly with each other, without need for the remote server 132$_2$, at least not for select communications, such as sharing of vehicle data from the host device 150 to the portable apparatus 111.

Components that can be the same as those of FIG. 2, or analogous or similar to those of FIG. 2, are referenced by the same numeral in FIG. 3, and may not all be described in greater detail in this section.

The portable system is referenced in this embodiment by numeral 310, and the host device by 350, which may be part of a greater system 351, like system 151 of FIG. 2.

III.B.1. Portable System 310 with Remote-Link Structures

Structures of the hardware-based storage device 112 in the embodiments of FIG. 3 include:

Applications 118$_1$, 118$_2$, . . . , 118$_N$ (one or more, wherein N is a positive non-zero integer);

Synchronization module 120$_2$, second embodiment (the first embodiment being in FIG. 2, at numeral 120$_2$);

Host-device-hardware communication sub-module 322, such as an OBD sub-module;

VIP client sub-module 324, analogous or similar to that 124 of FIG. 2; and

Portable-system-projection server sub-module 326 (e.g., phone-projection server sub-module).

Some example structure of the hardware-based storage device 112—such as a file sub-system, media codec components, framebuffer capture components, PLC, etc.—is described above regarding the embodiment of FIG. 2.

The application(s) 118 and the HMI(s) 125 are also described above.

As mentioned regarding the HMI(s) 125, the interface component 125 can be used to affect functions and settings of one or both of the portable system 310 and the host device 350 based on user input. Signals or messages corresponding to inputs received by the interface component 125 are transferred to the processing hardware unit 114, which, executing code of the hardware-based storage device 112, sets or alters a function at the portable system 310. Inputs received can also trigger generation of a communication, such as an instruction or message, for the host device 350, and sending the communication to the host device 350 for setting or altering a function or setting of the host device 350.

The portable system 310 is in some embodiments configured to connect to the host device 350 by a wireless communication 131 or by a hard, or wired connection 129. The wired connection is referred to primarily herein as being wired in a non-limiting sense. The connection can include components connecting wires, such as the USB plug-and-port arrangement described, or wireless components can include as wireless USB. In some embodiments, the connection is configured according to higher throughput arrangements, such as using an HDMI port or a VGA port. In various embodiments, wired communications are effected between a data-communications plug 128 of the portable system 10 and a matching data-communications port 168 of the host device 350.

The portable system 310 can, as mentioned, be configured as a dongle, in which case an example data-communications plug 128 is a USB plug, for connecting to a USB port 168 of the host device 350.

In these ways, advanced functions can be available by way of a relatively low-rate connection, such as USB device class components, whereas they would not otherwise be. And if a higher- or high-capability class device is available (e.g., if the vehicle is already configured with or for such device class), the system can be configured to directly use the higher-capability class device to provide the advanced functions.

While the portable system 310 is in some embodiments a portable mass-storage device, more advanced USB device classes such as Media Transfer Protocol (MTP) could be supported.

The portable system 310 is configured in various embodiments to operate any one or more of a variety of types of computer instructions that it may be programmed with for dynamic operations and/or that it may receive for dynamic processing at the system 310.

By numeral 130 in FIG. 2 is referenced a wireless input or input/output (I/O) device—e.g., transceiver—or simply a transmitter. Wireless communications with the host device 350 and external apparatus 132 [external networks $132_1$ (Internet, etc.—FIGS. 1, 2) and remote systems $132_2$ (servers, etc.)], are referenced by numerals 131, 133, respectively.

The portable-system synchronization module $120_2$ performs various functions of the arrangement 300 at the portable system 310. The portable-system synchronization module $120_2$ includes or is connected to any of the mentioned host-device-hardware communication sub-module 322 (e.g., OBD sub-module), VIP client sub-module 324, and portable-system-projection server sub-module 326 (e.g., phone-projection server sub-module).

The portable-system synchronization module $120_2$ can in any ways be like the portable-system synchronization module $120_1$ described above in connection with FIG. 2.

In operation, the host-device-hardware communication sub-module 322, such as an OBD sub-module receives data from the host device 350 by wired or wireless connection. The connection may be via an OBD port of the host-device, and the sub-module 322 and/or one of the other interfaces—e.g., 128, 130—include components to perform any authentication or other communication-related functions.

The host-device-hardware communication sub-module 322 in various embodiments performs functions including decoding and any other suitable data processing on the received host-device data.

The host-device data may be like that provided above regarding FIG. 2, such as containing vehicle dynamics, environmental, or navigation information, to name a few examples.

The VIP client sub-module 324 can in any way be like the VIP client sub-module 124 of FIG. 2.

And the portable-system-projection server sub-module 326 can in any way be like the portable-system projection server sub-module 126, such as a phone-projection server sub-module, of FIG. 2. The portable-system-projection server sub-module 326 for instance, interfaces directly with the host device 150, by wired or wireless connection, for sharing portable-system output, such as output of a portable-system app using the host-device (e.g., vehicle) data received from the host device 350 and the VIP client sub-module 324. Transfer to the host device 150 is indicated schematically by the lower dashed line in FIG. 3, and is made via the data-communications port or wired component 168 or input/output components such as a wireless components 170.

III.B.2. Host Device 350 with Wired or Short-Range Wireless Connection for Host-Device Data Transfer The structures of the hardware-based storage device 352 of the host device 350 in various embodiments of FIG. 3 include:

Host-synchronization module $158_2$;

Host-device-hardware sub-module 360, e.g., OBD, connector sub-module 360, (e.g., OBD dongle sub-module);

VIP server sub-module 362; and

Portable-system-projection client sub-module 364 (e.g., phone-projection client sub-module).

As with the applications 118 of the portable system 310, the applications 380 of the host device 350 are in various embodiments made or provided by an original equipment manufacturer (OEM) of the host device, e.g., automobile. The applications 380 otherwise be like those of the host device 150 of FIG. 2, such as by being proprietary to a maker (e.g., OEM) of the host vehicle.

The host-device synchronization module $158_3$ can in any way be like the host-device sync modules of the embodiments of FIGS. 2 and 3. The host-device synchronization module $158_3$ may, for instance, include or be in communication with any of the related components in the memory 352—e.g., the host-device-hardware sub-module 360, the VIP server sub-module 362, and portable-system-projection client sub-module 364.

host-device-hardware sub-module 360 (e.g., OBD, connector sub-module, or OBD dongle sub-module), the VIP server sub-module 362, and the portable-system-projection client sub-module 364 (e.g., phone-projection client sub-module).

The host-device-hardware sub-module 360 (e.g., OBD, connector sub-module, or OBD dongle sub-module) requests and receives, or otherwise obtains, host-device data (e.g., vehicle data) to be used by the portable system 310. The host-device data may, as mentioned, include any data mentioned above regarding the analogous module 160 of FIG. 2. The data may include, for instance, information related to a host vehicle or vehicle operations that may be useful to an applications $118_N$ operating at the portable system 310, such as vehicle dynamics, environmental, or navigation information. The HDH sub-module 360 can in any way be like any of the other server sub-modules (e.g., 160) described above.

The VIP server sub-module 362 processes the host-device data in any suitable manner for presentation to, and use at, the portable system 310, such as formatting for transfer by an OBD port, in some cases using an OBD protocol for wireless or wired transmission.

Transfer to the portable system 310, by wired or short-range wireless communication, is indicated schematically by the upper dashed and arrowed line of FIG. 3, and uses the data-communications port or wired component 168 or input/output components such as a wireless components 170.

The VIP app framework sub-module 462 can in any way be like any of the other interface modules for sending host-device data to the portable system 310 (e.g., modules 162, 462) described herein.

FIG. 3, like FIG. 2, shows host-device interface components 172, such as one or more host-device input and/or output components. The components 172 may, for instance, receive input, such as speech input, requesting or ordering a change in setting or function of the host device 350 or the portable system 310.

III.B.3. Summary and Select Benefits of Arrangement 300

This arrangement 300, like that 200 of FIG. 2, provides a secure and efficient mechanism to pass, to an application/s $118_N$ hosted on the portable system 310, host-device information requisite for function of the application, such as vehicle speed or altitude information. The interaction allows transport of the host-device information by way of a first link layer or protocol, being a different link layer than a second link layer or protocol, such as a phone-projection layer connecting the portable system 310 and an automobile host device, by which the portable system 310 provides function via the vehicle, such as a function used by a vehicle driver, using a main automobile display for displaying information to the vehicle driver.

The first link layer or protocol is in various embodiments a proprietary layer or protocol, such as between an OEM-made host device 150 and an OEM-made portable system application. By this first link layer, proprietary, or highly-secure, host device data (e.g., vehicle data), which is typically not shared outside of current vehicles, is shared securely with a portable system 310 in communication with the host device 350.

The second link layer or protocol may be an open layer, or another proprietary layer or protocol distinct from the first layer or protocol. The first may be a proprietary layer or protocol provided by the OEM, and the second layer or protocol may be a third-party layer or protocol, created by a third-party company.

The first and second link layers, or protocols, can be viewed as parallel connected transport layers between the portable system 310 and the host device 350.

The first-layer sub-modules 322, 324 of the portable system 310 and the host device 350 are in various embodiments configured to emulate a single-layer, or single-connection, communication technology by which the portable system 310 would receive host-device data from the host device 350 and after processing the same, using a portable-system application/s $118_N$, deliver output for consumption by a user via the host device 350—e.g., automobile display and/or audio system.

The arrangement 300 provides a secure and efficient manner for the host device 350 and portable system 310 to interface, for providing various services, such as host-data-related (e.g., vehicle-data-related) services from the portable system 310 based on host data—e.g., vehicle data—provided to the system 310 directly, by wire or short-range transfer, from the host device 350 to the portable system 310.

A remote server $132_2$ is thus not needed for the host data transfer in this arrangement 300, saving cost, time in transfer, and resources such as the requisite server structure and code of the first arrangement 200.

For security, data transmissions and/or the data shared between the host device 350 and the portable system 310 are protected in any suitable manner, such as by encryption, as are transmissions between the remote system and portable system 310.

The host device 350 and portable system 310 interface to emulate next-generation technology expected for future models of host devices and portable system. The next-generation technology would allow the host vehicle to share host data—such as vehicle data, and in some embodiments particularly proprietary or highly-sensitive vehicle data, directly with portable system 310, such as by wired or wireless connection—and by a single channel or layer of interaction. Previously, proprietary vehicle data could not be accessed by external devices.

The host device 350 and portable system 310 of the present arrangement 300, too, work together as if they 310, 350 had the mentioned next-generation technology allowing the single-layer interaction, for enabling portable-system app functions using host-device data, except by the present embodiments, the two described layers are used instead of a single layer.

By the arrangement, vehicles and/or portable systems lacking technology enabling the single-layer functioning, which can be referred to as legacy vehicles and portable systems, can be improved to perform the same functioning using multiple layers.

The arrangements in various embodiments establish a bridge between custom mobile app products—e.g., applications $118_N$—operating at the portable system 111, which may be provided by the host (e.g., vehicle) OEM, and the OEM vehicles, allowing private and secure exchange from the host to the portable apps of sensitive host data (e.g., vehicle data) using a secure private, or proprietary, channel in tandem with using a partner-based technology standards for less-sensitive data for data transfer from the portable system to the host, such as for phone projection functions, such as for portable system/accessory/peripheral projection functions. The projection functions can include any known such function, such as presenting media, navigation, or information to the user (e.g., vehicle driver or passenger) via the host device interface 172—e.g., vehicle display screen and/or speakers, and in various embodiments the user can control the subject application/s $118_N$ and/or subject functions of the host device via the host-device interface 172, such as touch-sensitive display screen.

The partner-based technology may include, e.g., protocols that the OEM develops with, purchases from, licenses from, etc., a partner, and/or approves use of the same with the host device. An example is a USB wireless connection between the host device and portable system.

By changing or making the portable system and host device according to the embodiments of the present technology, little to no expensive changes are needed to the hardware, operating system, or other software of the host (e.g., vehicle) and portable system, while enabling the next generation performance referenced.

III.C. FIG. 4—Local-Software Focused Attachment

FIG. 4 shows another example arrangement 400 providing a secure and efficient mechanism to pass, to an application 118 hosted on a portable system 410, host-device information requisite for function of the application, such as vehicle speed or altitude information. The interaction allows transport of the host-device information by way of a first link layer or protocol, being a different link layer than a second link layer or protocol, such as a phone-projection layer connecting the portable system 310 and an automobile host device. By such second layer, the portable system 310 can provide function via the host device to a host device user, such as via a vehicle display.

As with the embodiment of FIG. 3 versus that of FIG. 2, differences between the embodiments of FIG. 2 and the embodiments of FIG. 3 include those of FIG. 3 having, instead of the remote-link components of FIG. 2, the host device and portable system have communicating hardware/ software components that communicate directly with each other, without need for the remote server $132_2$, at least not for select communications, such as sharing of vehicle data from the host device 150 to the portable apparatus 111. In the embodiments of FIG. 3, first layer communications (e.g., proprietary vehicle data) are provided via an OBD or other vehicle-hardware channel allowing sharing of such data, or at least to approved authenticated devices, as the portable system 310 would be.

Components that can be the same as those of FIG. 2 or 3, or analogous or similar to those, are referenced by the same numeral in FIG. 4, and may not be described in greater detail in this section.

The portable system is referenced in this embodiment by numeral 410, and the host device by 450, which may be part of a greater system 451, like system 151 of FIG. 2.

III.C.1. Portable System 410 with App Framework

Structures of the hardware-based storage device 112 in the embodiments of FIG. 4 include:

Applications $118_1$, $118_2$, ..., $118_N$ (one or more, wherein N is a positive non-zero integer);
Synchronization module $120_3$;
VIP client sub-module 422; and
Portable-system-projection server sub-module 424 (e.g., phone-projection server sub-module).

Some example structure of the hardware-based storage device 112—such as a file sub-system, media codec components, framebuffer capture components, PLC, etc.—is describe above regarding the embodiment of FIG. 2.

The application(s) 118 and the HMI(s) 125 are also described above.

The portable-system synchronization module $120_3$ performs various functions of the arrangement 300 at the portable system 410. The portable-system synchronization module $120_3$ includes or is connected to any of the mentioned VIP client sub-module 422 and portable-system-projection server sub-module 424 (e.g., phone-projection server sub-module).

The portable-system synchronization module $120_3$ can in any ways be like the portable-system synchronization modules $120_{1, 2}$ described above.

In operation, the VIP client sub-module 422 receives data from the host device 450. The transfer may be made via a wired or wireless USB, or other wired or short-range wireless connection 129, 131.

The VIP client sub-module 422 in various embodiments performs functions including decoding and any other suitable data processing on the received host-device data. The same may be performed by the VIP client sub-modules 124, 324 of embodiments of FIG. 2 or 3, for instance.

The host-device data may be like that provided above regarding FIG. 2, such as containing vehicle dynamics, environmental, or navigation information, to name a few examples.

The portable-system-projection server sub-module 424 can in any way be like the portable-system projection server sub-module 326 of FIG. 3. The portable-system-projection server sub-module 424, for instance, interfaces directly with the host device 450, by wired or wireless connection, for sharing portable-system output, such as output of a portable-system app using the host-device (e.g., vehicle) data received from the host device 450 and the VIP client sub-module 422. Transfer to the host device 150 is indicated schematically by the lower dashed line in FIG. 4, and is made via the data-communications port or wired component 168 or input/output components such as a wireless components 170.

III.C.2. Host Device 450 with Wired or Short-Range Wireless Connection for Host-Device Data Transfer The structures of the hardware-based storage device 452 of the host device 450 in various embodiments of FIG. 4 include:

Synchronization module $158_3$, third embodiment;
VIP server sub-module 460; and
VIP app framework sub-module 462;
Portable-system-projection client sub-module 464 (e.g., phone-projection client sub-module).

As with the applications 118 of the portable system 410, the applications 480 of the host device 450 are in various embodiments made or provided by an original equipment manufacturer (OEM) of the host device, e.g., automobile. The applications 480 can otherwise be like those of the host device 150 of FIG. 2, such as by being proprietary to a maker (e.g., OEM) of the host vehicle.

The host-device synchronization module $458_1$ can in any way be like the host-device sync module 158 of FIG. 2. The host-device synchronization module $358_1$ may, for instance, include or be in communication with any of the related components in the memory 452—e.g., VIP server sub-module 460, the VIP app framework sub-module 462, and the portable-system-projection client sub-module 464.

The VIP server sub-module 460 requests and receives, or otherwise obtains, host-device data (e.g., vehicle data) to be used by the portable system 410. The host-device data may, as mentioned, include any data mentioned above regarding the analogous modules 160, 360 of FIGS. 2 and 3. The data may include, for instance, information related to a host vehicle or vehicle operations that may be useful to an application(s) $118_N$ operating at the portable system 410, such as vehicle dynamics, environmental, or navigation information.

The VIP server sub-module 460 can in any way be like any of the other server sub-modules (e.g., 160, 360) described above.

The VIP app framework sub-module 462 processes the host-device data in any suitable manner for presentation to, and use at, the portable system 410, such as formatting for transfer by an OBD port, in some cases using an OBD protocol for wireless or wired transmission. Transfer to the portable system 410, by wired or short-range wireless communication, is indicated schematically by the upper dashed and arrowed line of FIG. 4, and uses the data-communications port or wired component 168 or input/output components such as a wireless components 170.

The VIP app framework sub-module 462 can in any way be like any of the other interface modules for sending host-device data to the portable system 410 (e.g., modules 162, 362) described above.

FIG. 4 also shows host-device interface components 172, such as one or more host-device input and/or output components. The components 172 may, for instance, receive input, such as speech input, requesting or ordering a change in setting or function of the host device 450 or the portable system 410.

III.C.3. Summary and Select Benefits of Arrangement 400

This arrangement 400, like those above 200, 300, provides a secure and efficient mechanism to pass, to an application $118_N$ hosted on the portable system 410, host-device information requisite for function of the application—e.g., vehicle speed or altitude information, and to transport the information by way of a first link layer or protocol, being a different link layer than a second link layer or protocol, enabling some operation of the application at the host device, such as a phone-projection layer connecting the portable system 410 and an automobile host device, by which the portable system 410 provides function via the vehicle, such as a function used by a vehicle driver, using a main automobile display for displaying information to the vehicle driver.

The first link layer or protocol is in various embodiments a proprietary layer or protocol, such as between an OEM-made host device 150 and an OEM-made portable system application. By this first link layer, proprietary, or highly-secure, host device data (e.g., vehicle data), which is typically not shared outside of current vehicles, is shared securely with a portable system 410 in communication with the host device 450.

The second link layer or protocol may be an open layer, or another proprietary layer or protocol distinct from the first layer or protocol. The first may be a proprietary layer or protocol provided by the OEM, and the second layer or protocol may be a third-party layer or protocol, created by a third-party company.

The first and second link layers, or protocols, can be viewed as parallel connected transport layers between the portable system 410 and the host device 450.

The first-layer sub-modules 422, 424 of the portable system 410 and the host device 450 are in various embodiments configured to emulate a single-layer, or single-connection, communication technology by which the portable system 410 would receive host-device data from the host device 450 and after processing the same, using a portable-system application/s $118_N$, deliver output for consumption by a user via the host device 450—e.g., automobile display and/or audio system.

The arrangement 400 provides a secure and efficient manner for the host device 450 and portable system 410 to interface, for providing various services, such as host-data-related (e.g., vehicle-data-related) services from the portable system 410 based on host data—e.g., vehicle data—provided to the system 410 directly, by wire or short-range transfer, from the host device 450 to the portable system 410.

Like the arrangement 300 of FIG. 3, a remote server $132_2$ is thus not needed for the host data transfer in this arrangement 400, saving cost, time in transfer, and resources such as the requisite server structure and code of the first arrangement 200.

For security, data transmissions and/or the data shared between the host device 450 and the portable system 410 are protected in any suitable manner, such as by encryption, as are transmissions between the remote system and portable system 410.

The host device 450 and portable system 410 interface to emulate next-generation technology expected for future models of host devices and portable system. The next-generation technology would allow the host vehicle to share host data—such as vehicle data, and in some embodiments particularly proprietary or highly-sensitive vehicle data, directly with portable system 410, such as by wired or wireless connection—and by a single channel or layer of interaction. Previously, proprietary vehicle data could not be accessed by external devices.

The host device 450 and portable system 410 of the present arrangement 400, too, work together as if they 410, 450 had the mentioned next-generation technology allowing the single-layer interaction, for enabling portable-system app functions using host-device data, except by the present embodiments, the two described layers are used instead of a single layer.

By the arrangement, vehicles and/or portable systems lacking technology enabling the single-layer functioning, which can be referred to as legacy vehicles and portable systems, can be improved to perform the same functioning using multiple layers.

The arrangements in various embodiments establish a bridge between custom mobile app products—e.g., applications $118_N$—operating at the portable system 111, which may be provided by the host (e.g., vehicle) OEM, and the OEM vehicles, allowing private and secure exchange from the host to the portable apps of sensitive host data (e.g., vehicle data) using a secure private, or proprietary, channel in tandem with using a partner-based technology standards for less-sensitive data for data transfer from the portable system to the host, such as for phone projection functions, such as for portable system/accessory/peripheral projection functions. The projection functions can include any known such function, such as presenting media, navigation, or information to the user (e.g., vehicle driver or passenger) via the host device interface 172—e.g., vehicle display screen and/or speakers, and in various embodiments the user can control the subject application/s $118_N$ and/or subject functions of the host device via the host-device interface 172, such as touch-sensitive display screen.

The partner-based technology may include, e.g., protocols that the OEM develops with, purchases from, licenses from, etc., a partner, and/or approves use of the same with the host device. An example is a USB wireless connection between the host device and portable system.

By changing or making the portable system and host device according to the embodiments of the present technology, little to no expensive changes are needed to the hardware, operating system, or other software of the host (e.g., vehicle) and portable system, while enabling the next generation performance referenced.

IV. Algorithms and Functions

The schematic component drawings of FIGS. 2-4 are intended to, along with showing structure, show process and algorithmic flow.

Connections and interactions between components are not in every instance shown to simplify the drawings, such as regarding the applications $118_N$, and some interactions are shown, such as by brackets or arrows.

Regarding the flows shown and described above, it should be understood that operations are not necessarily presented in a particular order and that performance of some or all the operations in an alternative order is possible and contemplated. The operations have been presented in the demonstrated order for ease of description and illustration. Operations can be added, omitted and/or performed simultaneously without departing from the scope of the appended claims.

It should also be understood that any of the flows can be ended at any time. In certain embodiments, some or all operations of this process, and/or substantially equivalent operations are performed by execution by the hardware-based processing units 114, 154 of computer-executable code of the storage devices 112, 152 provided herein.

Operations described, by way of example in connection with embodiments herein, as being performed by a certain structure—e.g., device, module or sub-module—need not in every embodiment be performed by that structure. Activity described as being performed by the portable apparatus 111, or particularly the processing unit 114 or a module thereof, may be performed by a another module of the portable apparatus 111, or by a remote apparatus, for instance, or the host device 150, having corresponding structure, such as the subject module(s)/sub-module(s) for performing the activity.

V. Other Select Benefits and Advantages

Many of the benefits and advantages of the present technology are described above. The present section restates some of those and references some others. The benefits described are not exhaustive of the benefits of the present technology.

The technology provides a simpler vehicle-data interface between the vehicle and mobile devices such as a user smartphone, wearable device, user plug-in device, such as a USB mass storage device or dongle device, and such a device configured to communicate wirelessly.

The technology allows OEMs or other companies to bridge mobile application design and strategy backwards to existing mobile application projection and integration technologies.

The technology provides a data-sharing solution that has greater scalability than legacy arrangements for vehicle-data interface between vehicle and mobile devices.

The technology provides a data-sharing solution that has greater updatability, whether by wire or wirelessly from a local apparatus or remote, than legacy arrangements for vehicle-data interface between vehicle and mobile devices.

The technology provides a more-secure and more-private data-sharing solution, including secure private or proprietary channel, link, and/or protocol, having greater updatability than legacy arrangements for host device/portable system interfaces for sharing sensitive and any other host-data (e.g. vehicle-data) from the host to the portable system.

VI. Conclusion

Various embodiments of the present disclosure are disclosed herein. The disclosed embodiments are merely examples that may be embodied in various and alternative forms, and combinations thereof.

The above-described embodiments are merely exemplary illustrations of implementations set forth for a clear understanding of the principles of the disclosure.

References herein to how a feature is arranged can refer to, but are not limited to, how the feature is positioned with respect to other features. References herein to how a feature is configured can refer to, but are not limited to, how the feature is sized, how the feature is shaped, and/or material of the feature. For simplicity, the term configured can be used to refer to both the configuration and arrangement described above in this paragraph.

Directional references are provided herein mostly for ease of description and for simplified description of the example drawings, and the systems described can be implemented in any of a wide variety of orientations. References herein indicating direction are not made in limiting senses. For example, references to upper, lower, top, bottom, or lateral, are not provided to limit the manner in which the technology of the present disclosure can be implemented. While an upper surface may be referenced, for example, the referenced surface can, but need not be, vertically upward, or atop, in a design, manufacturing, or operating reference frame. The surface can in various embodiments be aside or below other components of the system instead, for instance.

Any component described or shown in the figures as a single item can be replaced by multiple such items configured to perform the functions of the single item described. Likewise, any multiple items can be replaced by a single item configured to perform the functions of the multiple items described.

Variations, modifications, and combinations may be made to the above-described embodiments without departing from the scope of the claims. All such variations, modifications, and combinations are included herein by the scope of this disclosure and the following claims.

What is claimed is:

1. A portable system, for use in projecting proprietary host-data-based output to a host device using a dual-layer proprietary-data-provision arrangement including the host device and the portable system, comprising:
   a hardware-based processing unit; and
   a non-transitory computer-readable storage component comprising:
      one or more first-layer components, of the dual-layer proprietary-data-provision arrangement, that, when executed by the hardware-based processing unit, communicate with the host device by way of a first wired communication channel or a first short-range wireless communication channel to receive the proprietary host data from the host device;
      a portable-system application that, when executed by the hardware-based processing unit, generates, based on the proprietary host data, proprietary host-data-based app output; and
      one or more second-layer components, of the dual-layer proprietary-data-provision arrangement, that, when executed by the hardware-based processing unit, communicate with the host device by way of a second wired communication channel or a second short-range wireless communication channel to provide the proprietary host-data-based app output to the host device for rendering at the host device, wherein the first wired communication channel and the first short-range wireless communication channel are distinct from the second wired communication channel and the second short-range wireless communication channel, respectively.

2. The portable system of claim 1 wherein the host device is part of, or includes a vehicle of transportation.

3. The portable system of claim 1 wherein the proprietary host data comprises one or more of:
   host-device dynamics information;
   host-device environmental information; and
   host-device navigation information.

4. The portable system of claim 1 wherein the one or more first-layer components of the dual-layer proprietary-data-provision arrangement comprise a host-device-hardware communication module.

5. The portable system of claim 4 wherein the host-device-hardware communication module includes an onboard diagnostics (OBD) module.

6. The portable system of claim 1 wherein the one or more first-layer components of the dual-layer proprietary-data-provision arrangement comprise a host-interaction protocol client module.

7. The portable system of claim 1 wherein the first wired communication channel and the first short-range wireless communication channel are the same as the second wired communication channel and the second short-range wireless communication channel, respectively.

8. The portable system of claim 1 wherein:
the first-layer components comprise a host-communications client module that, when executed by the hardware-based processing unit, receives the proprietary host data from the host device by way of the first wired or short-range wireless communication channel; and
the second-layer components comprise a portable-system-projection server module that, when executed by the hardware-based processing unit:
receives the proprietary host-data-based app output data from the portable-system application; and
sends the proprietary-host-data-based app output data to the host device by way of the second wired communication channel or the second short-range wireless communication channel for presentation at the host device.

9. A hardware-based non-transitory computer-readable storage device, for use at a portable system to project proprietary host-data-based output to a host device using a dual-layer proprietary-data-provision arrangement including the host device and the portable system, comprising:
one or more first-layer components, of the dual-layer proprietary-data-provision arrangement, that, when executed by a hardware-based processing unit of the portable system, communicate with the host device by way of a first wired communication channel or a first short-range wireless communication channel to receive the proprietary host data from the host device;
a portable-system application that, when executed by the hardware-based processing unit, generates, based on the proprietary host data, proprietary host-data-based app output; and
one or more second-layer components, of the dual-layer proprietary-data-provision arrangement, that, when executed by the hardware-based processing unit, communicate with the host device by way of a second wired communication channel or a second short-range wireless communication channel to provide the proprietary host-data-based app output to the host device for rendering at the host device;
wherein:
the first-layer components comprise a host-communications client module that, when executed by the hardware-based processing unit, receives the proprietary host data from the host device by way of the first wired or short-range wireless communication channel; and
the second-layer components comprise a portable-system-projection server module that, when executed by the hardware-based processing unit:
receives the proprietary host-data-based app output data from the portable-system application; and
sends the proprietary-host-data-based app output data to the host device by way of the second wired communication channel or the second short-range wireless communication channel for presentation at the host device.

10. The hardware-based non-transitory computer-readable storage device of claim 9 wherein the host device is, is part of, or includes a vehicle of transportation.

11. The hardware-based non-transitory computer-readable storage device of claim 10 wherein:
the proprietary host data is proprietary vehicle data; and
the proprietary vehicle data comprises one or more of:
vehicle dynamics information;
vehicle environmental information; and
vehicle navigation information.

12. The hardware-based non-transitory computer-readable storage device of claim 9 wherein the host-device-hardware communication module includes an onboard diagnostics (OBD) module.

13. The hardware-based non-transitory computer-readable storage device of claim 9 wherein the one or more first-layer components of the dual-layer proprietary-data-provision arrangement comprise a host-interaction protocol client module.

14. A host device, for projecting proprietary-host-data-based output utilizing a dual-layer proprietary-data-provision arrangement including a portable system and the host device, comprising:
a hardware-based processing unit; and
a non-transitory computer-readable storage component comprising:
one or more first-layer components, of the dual-layer proprietary-data-provision arrangement, that, when executed by the hardware-based processing unit, communicate with the portable system by way of a first short-range communication channel or a first wired communication channel; and
one or more second-layer components, of the dual-layer proprietary-data-provision arrangement, that, when executed by the hardware-based processing unit, communicate with the portable system by way of a second wired communication channel or a second short-range wireless communication channel;
wherein the first-layer components comprise a proprietary portable-system-communications server module that, when executed by the hardware-based processing unit, sends proprietary host data to the portable system by way of the first wired or short-range wireless communication channel; and
wherein the second-layer components comprise a host-system-projection client module that, when executed by the hardware-based processing unit:
receives, from the portable system, by way of the wired communication channel or the short-range wireless communication channel, proprietary host-data-based portable-system app output generated at the portable system using the proprietary host data sent; and
initiating presenting, by way of a host user-machine interface, host data output based on the proprietary-host-data-based portable-system app output.

15. The host device of claim 14 wherein the one or more first-layer components comprise an onboard diagnostics (OBD) module and a host-device-interaction server module.

16. The host device of claim 14 wherein the one or more first-layer components comprise a host-device-interaction server module and a host-device application-framework module.

17. The host device of claim 14 wherein the first wired communication channel and the first short-range wireless communication channel are distinct from the second wired communication channel and the second short-range wireless communication channel, respectively.

18. The host device of claim 14 wherein:
   the proprietary host data is proprietary vehicle data; and
   the proprietary vehicle data comprises one or more of:
      vehicle dynamics information;
      vehicle environmental information; and
      vehicle navigation information.

* * * * *